(12) United States Patent
Eren et al.

(10) Patent No.: US 8,813,260 B2
(45) Date of Patent: Aug. 19, 2014

(54) SELF-CONTAINED DEVICE SECURITY

(75) Inventors: Selcuk S. Eren, Chapel Hill, NC (US);
Brian J. Jaeger, Chapel Hill, NC (US);
Douglas A. Law, Chapel Hill, NC (US);
Paul A. Roberts, Raleigh, NC (US);
Shawn K. Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1997 days.

(21) Appl. No.: 11/561,871

(22) Filed: Nov. 20, 2006

(65) Prior Publication Data

US 2008/0120729 A1    May 22, 2008

(51) Int. Cl.
*G06F 21/70* (2013.01)

(52) U.S. Cl.
CPC ...................................... *G06F 21/70* (2013.01)
USPC .......................................................... 726/34

(58) Field of Classification Search
CPC ....................................................... G06F 21/70
USPC .......................................................... 726/34
See application file for complete search history.

(56) References Cited

U.S. PATENT DOCUMENTS

| 5,245,652 | A |   | 9/1993 | Larson et al. |
| 5,517,184 | A | * | 5/1996 | Miller et al. ................. 340/5.28 |
| 5,765,197 | A |   | 6/1998 | Combs |
| 6,880,054 | B2 |  | 4/2005 | Cheng et al. |
| 6,904,493 | B2 |  | 6/2005 | Chiao et al. |
| 2006/0004974 | A1 | | 1/2006 | Lin et al. |
| 2006/0036872 | A1 | * | 2/2006 | Yen .............................. 713/183 |

FOREIGN PATENT DOCUMENTS

GB            2257194 A      1/1993

* cited by examiner

*Primary Examiner* — Jacob Lipman
(74) *Attorney, Agent, or Firm* — Marcia L. Doubet

(57) ABSTRACT

Self-contained security for memory devices or, alternatively, for other devices and/or other types of machinery to be protected with user authentication. User authentication occurs within the device itself, enabling access to be physically unlocked when the proper security code is provided. A dialing approach is used, whereby a user rotates a disk-shaped device through a sequence of numbers or other symbols, in a similar manner to rotating the dial of a padlock. The device is inserted into a host device or receptacle (such as a Universal Serial Bus, or "USB", port), and receives power therefrom.

20 Claims, 6 Drawing Sheets

FIG. 1

Memory Disk
(Top View)

FIG. 2

Disk inserted into host device or external receptacle (Top View)

FIG. 3

Side View

Bottom View

FIG. 6

SELF-CONTAINED DEVICE SECURITY

BACKGROUND OF THE INVENTION

The present invention relates generally to security, and more particularly to providing self-contained device security (which may be used, for example, to secure information stored as an electronic identification or information stored in a memory device that provides memory for access by various types of computing systems).

In one existing approach, security for memory devices may be provided using software encryption that requires operating-system-specific software to be contained on the memory device—or, alternatively, on a host device (such as a portable computer) to which the memory device may be coupled. In addition, an external user interface for keyboard interaction with an authentication application is typically required in this approach, whereby a user supplies a security code for unlocking the memory device. As a disadvantage of this approach, decryption software that will decrypt a stored copy of the user's security code may be required for each operating system platform that might be running on the memory device or host, which may be prohibitively expensive for a development team to provide. In addition, malicious host sniffer software or a keystroke logger may be able to capture a security code entered by a user for transmission to the authentication application, which may permanently compromise the memory device's security.

In another existing approach, security for memory devices may be provided using biometric sensors such as thumbprint readers, retinal scanners, and so forth. In this approach, the memory device is required to learn each user's unique biometric feature (such as the user's thumbprint or retinal scan) as a reference sample and must be able identify a match to that sample upon a subsequent presentment by the same user, regardless of the then-current environmental conditions (such as dirt or other substances on the reader window and/or on the users' hand, eye, etc.). Biometric sensors may, in some cases, be inconvenient or non-intuitive to use. In addition, if the biometric sensor incurs damage, it may cease to operate; or, the biometric data may fail to match the previously-captured reference sample if the environmental conditions are non-optimal or if the user is not properly aligned with the biometric sensor (e.g., does not place his or her eye in the correct position relative to a retinal scanner).

BRIEF SUMMARY OF THE INVENTION

Preferred embodiments of the present invention provide self-contained security for securing information stored in a device, comprising: coupling, at least temporarily, the device to a host from which the device is adapted to receive a power signal, the host initially physically locked by the device from access thereto, wherein the power signal is received from the host responsive to the coupling; detecting, by the device, entry of an input pattern, the input pattern resulting from a plurality of rotation patterns performed on the device; comparing, by the device, the detected input pattern to a security code used to secure the stored information, wherein the security code is stored on the device; and physically unlocking access to the device, by the device, thereby enabling the host to access the stored information, if the comparison indicates that the detected input pattern matches the stored security code.

In a first aspect, the device is a memory device that provides, when access thereto is physically unlocked, memory for use by or through the host. In a second aspect, the device provides an electronic identifier, and the physically unlocking enables access to an electronic identification stored thereon.

In one approach, for each of the rotation patterns, the device detects the stopping by sensing a contact signal received from the host at the position of the stop and detects the rotating, and a direction of the rotating, by sensing the contact signal received from the host at the position of the stop and at zero or more interim positions past which the device is rotated before reaching the position of the stop.

These aspects may be provided as methods, systems, and/or computer program products.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

In a first aspect, preferred embodiments of the present invention provide self-contained security for memory devices. A memory device can be secured, according to preferred embodiments, without requiring encryption or authentication, host-based software, or biometric sensors adapted to unlock the device. In another aspect, the disclosed techniques may be used with other devices and/or other types of machinery (referred to generally herein as devices) to be protected with user authentication. In both aspects of the self-contained device security techniques disclosed herein, user authentication occurs within the device itself, enabling access to be physically unlocked (i.e., thereby providing access to information stored on the protected device) when the proper security code is provided.

Access to the memory device can be unlocked even in environmental conditions that are not well-suited to use of biometric sensors. Using techniques disclosed herein for securing memory devices enables users to share their security code with one another, if they so choose, which is not possible when biometrics are used for access protection. Embodiments of the present invention may be deployed in a relatively low-cost manner. The self-contained security device does not directly rely on a host to assist in authenticating the user, thereby obviating the need for a host device to provide platform-specific encryption and decryption code for locking and unlocking a security code stored on the memory device. And because the host device does not provide the authentication processing, sensitive security information (that might be intercepted by a sniffer or keystroke logger, when using prior art techniques) is not transmitted to the host device for authenticating the user.

Figure 1:
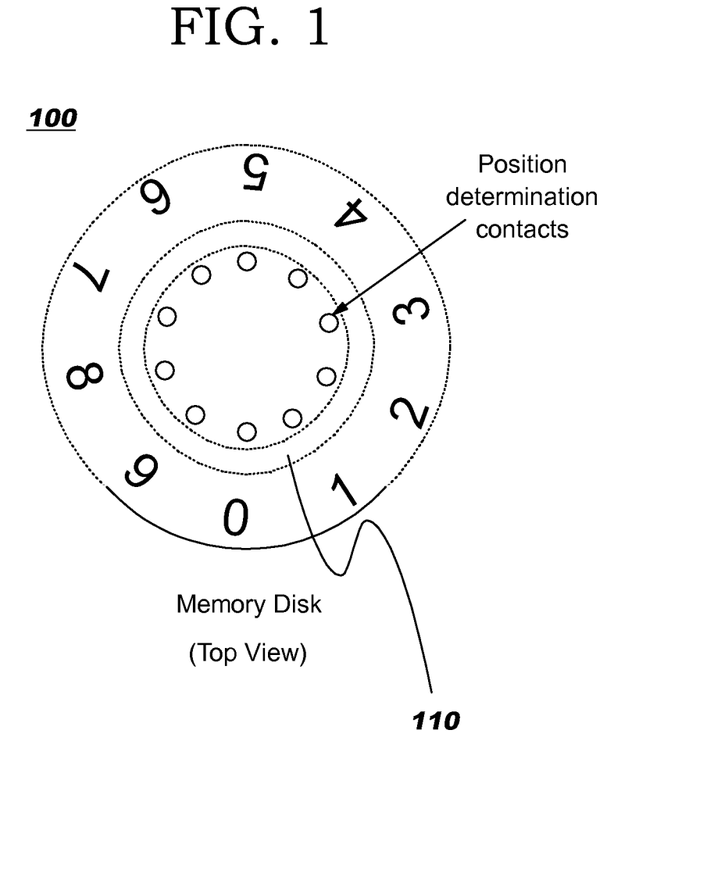
FIG. 1 depicts a sample memory device, according to preferred embodiments.
Figure 2:
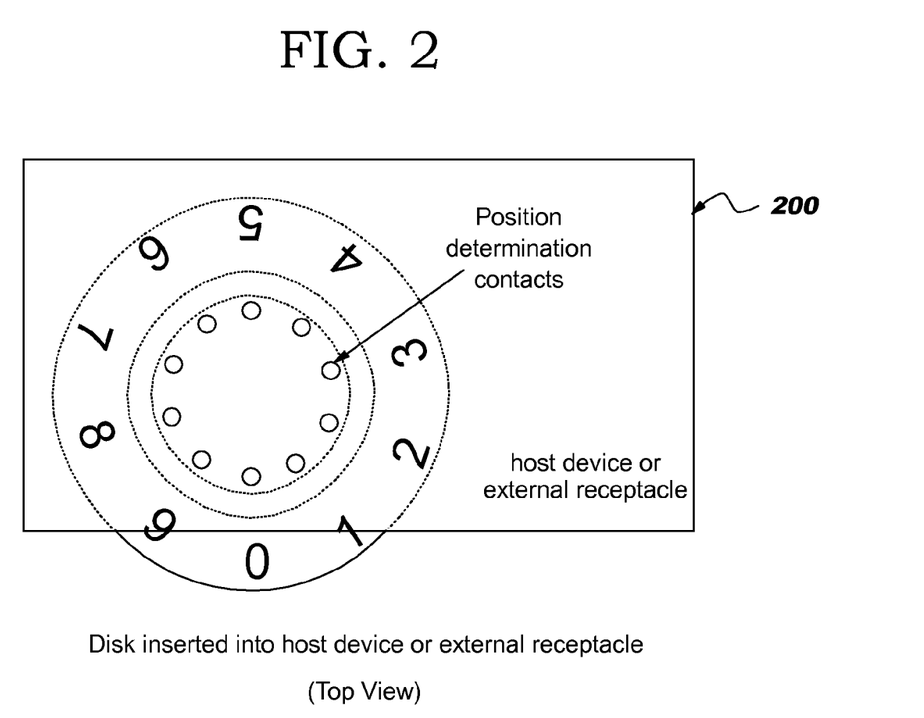
FIG. 2 illustrates the sample memory device of FIG. 1 inserted into, and partially protruding from, a host device or external receptacle.

Referring now to FIG. 1, a sample memory device 100 according to preferred embodiments is illustrated. As shown therein, the memory device 100 is preferably disk-shaped. Memory device 100 may be on the order of 1 to 2 inches in diameter, by way of illustration (but not of limitation), and can be carried by a user with relative ease. The memory device is inserted into a host device (e.g., into an appropriate slot or port of a portable computer, mobile phone, camera, portable digital assistant, etc.), or perhaps into a host-attached adapter. See FIG. 2, which illustrates the sample memory device 100 inserted into, and partially protruding from, a host device or external receptacle 200 (such as a laptop computer or external docking station therefor).

According to preferred embodiments of the present invention, with the memory device in place in, or otherwise coupled to (e.g., via a host-attached adapter), the host device for which the memory will be accessible, the user rotates the memory device through numbers which are preferably printed (or otherwise represented) thereupon, in a similar manner to rotating the dial of a padlock. Upon rotating the memory device through the proper sequence of numbers—that is, the sequence corresponding to the memory device's security code—the device then unlocks and the memory becomes accessible to the host device.

The security code for a particular memory device may be built in, for example by the device manufacturer. Optionally, an embodiment of the present invention may enable a user to change the security code. For example, a toolkit with a user interface for this purpose may be provided on a host device, and the toolkit may be operable to set or reset the security code on the memory device.

The memory device of preferred embodiments is relatively simple, robust, and capable of operating effectively in spite of adverse environmental conditions, as noted above. Using techniques disclosed herein, users are not required to train a device to recognize user-specific biometric samples. In addition, the memory device of preferred embodiments is undetectable by the host device (or other host machinery) until the security code has been property dialed; until that point, the memory device has no interaction with the host device except to draw power from its connection interface (as will be described in more detail herein). Therefore host sniffer software and/or keystroke loggers, which might capture a user's keystrokes when using a prior art device as noted above, are no longer a serious threat.

In one embodiment, the memory device is adapted for use with a Universal Serial Bus ("USB") port of a host device, and thus may be embodied as a USB memory key with self-contained security. (Embodiments of the present invention are not limited to use with USB ports, however.) Hereinafter, the term "host receptacle" is used to refer equivalently to a port or an adapter into which the memory device may be inserted. Standard USB ports provide 5 volts of output signal, and preferred embodiments are designed to leverage this 5-volt output.

Figure 3:
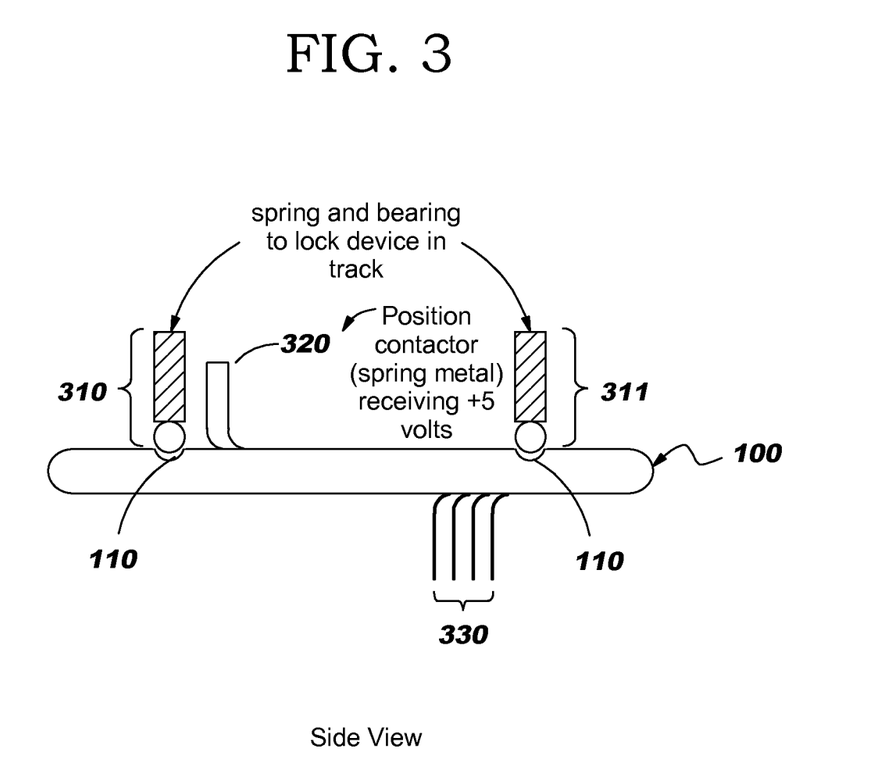
FIG. 3 illustrates a side view of the memory device of FIG. 1, showing contact from the host device or receptacle.

A circular track area, shown at reference number 110 of FIG. 1, is provided on the memory device, and this track is preferably used in conjunction with at least two spring and bearing assembly mechanisms provided by the host receptacle. When the memory device is inserted into the host receptacle, these spring and bearing assembly mechanisms lock the memory device into place while still allowing it to be rotated (e.g., with the user's thumb or finger). See FIG. 3, which provides a side view of memory device 100 and illustrates two host-provided spring and bearing assembly mechanisms 310, 311 seated in the circular track area of the memory device. USB interface contactors, shown at 330, are spring metal and provided by the host device in preferred embodiments.

Figure 4:
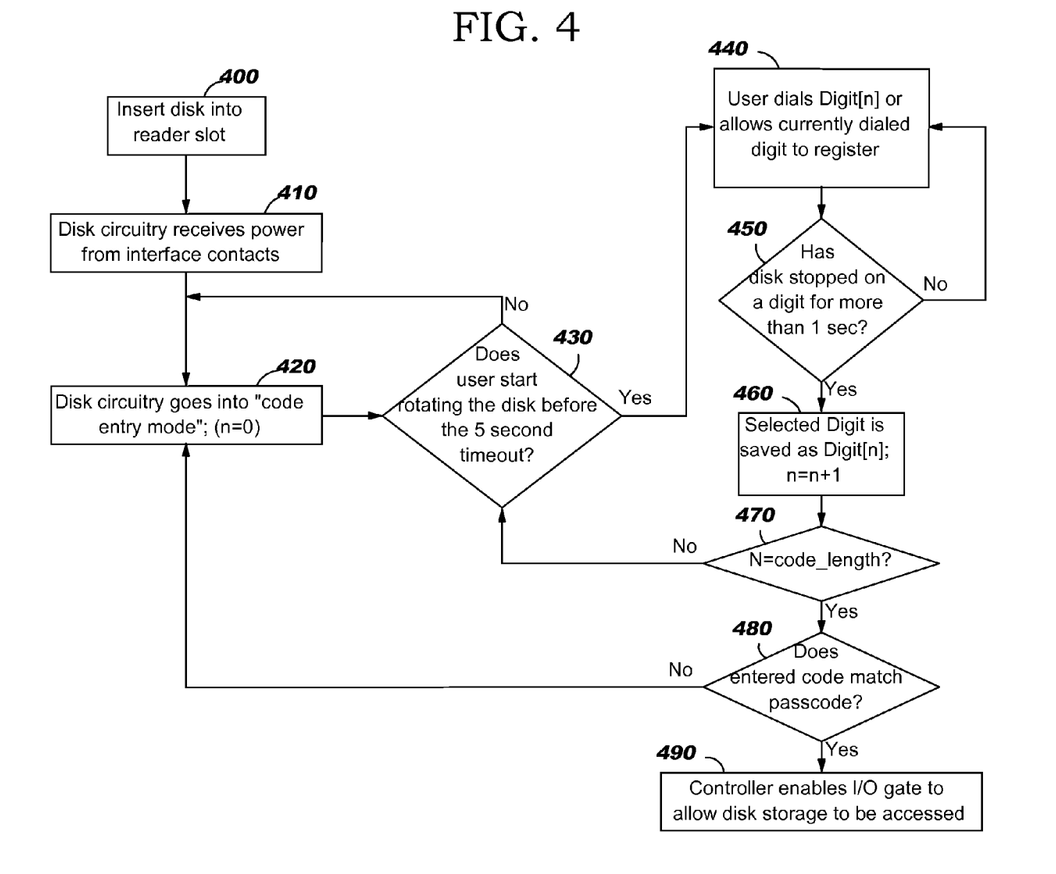
FIG. 4 provides a flowchart that depicts logic which may be used when implementing preferred embodiments.
Figure 5:
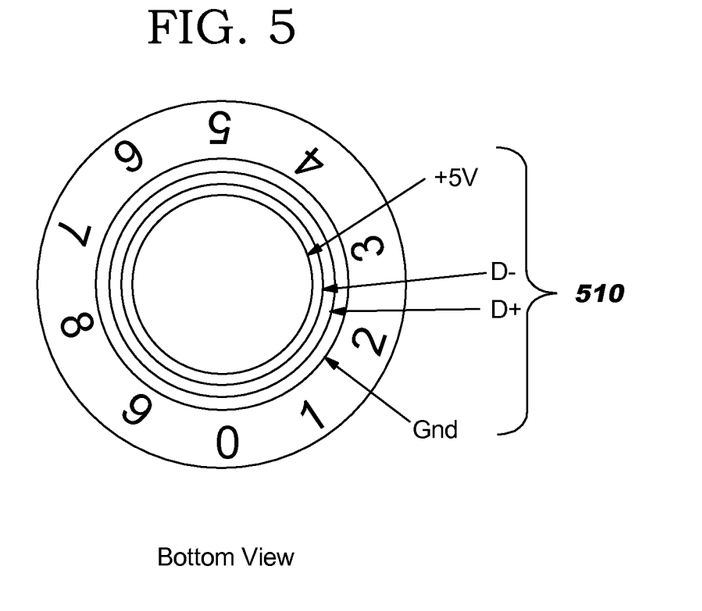
FIG. 5 provides a bottom view of the memory device of FIG. 1 and illustrates positioning of contact rings therewith.

FIG. 4 provides a flowchart that depicts logic which may be used when implementing preferred embodiments. When the memory device (referred to in FIG. 4 as a "disk") is inserted into the host receptacle (Block 400), as has been illustrated in FIG. 2, a plurality of contacts provide connectivity between the host device and the memory device. In one preferred embodiment, the contacts are provided as spring metal contacts, and 4 such contacts are preferably provided by the host device (as in the I/O lines of a standard USB port). Connectivity is preferably established using a matching number of contact rings, and these contact rings are preferably provided on the underside of the memory device. See FIG. 5, which provides a bottom view of the memory device and illustrates positioning of these contact rings. In FIG. 5, the contact rings are illustrated in combination with signal and power lines at reference number 510, where these signal and power lines are shown as being a +5 volts contact; a D− contact; a D+ contact; and a ground. Four contactors are provided on the host device, in preferred embodiments, and ride along these contact rings to allow for continuous connection to the USB signal and power lines. According to preferred embodiments, when the memory device is initially inserted into the host receptacle, the internal logic of the memory device has not enabled (e.g., supplied a signal to) the I/O ("input/output") driver gates to the contact rings; therefore, the host device has no electrical awareness that the memory device is present.

Preferably, a plurality of contacts (also referred to herein as "position determination contacts") are provided on the upper side of the memory device, with each position determination contact associated with one of the dialable numbers of the memory device. See FIG. 1, which illustrates 10 position determination contacts associated with the numbers 0 through 9. In preferred embodiments, a spring metal contact embodied on the host receptacle provides an interface contact source that presses against the upper side of the memory device at the correct radius from the memory device's center (i.e., aligned with the position determination contacts), so that the interface contact source is presented to each of the plurality of position determination contacts as the memory device is rotated by the user. In this manner, the position determination contacts will make contact with the interface contact source, one after another, as the disk is rotated (in one direction or another). In one preferred embodiment, the interface contact source is a 5-volt direct current ("DC") source. See FIG. 3, which provides a side view that illustrates the 5-volt position contactor at 320 as a spring metal contact pressing against the upper side of memory device 100.

Figure 6:
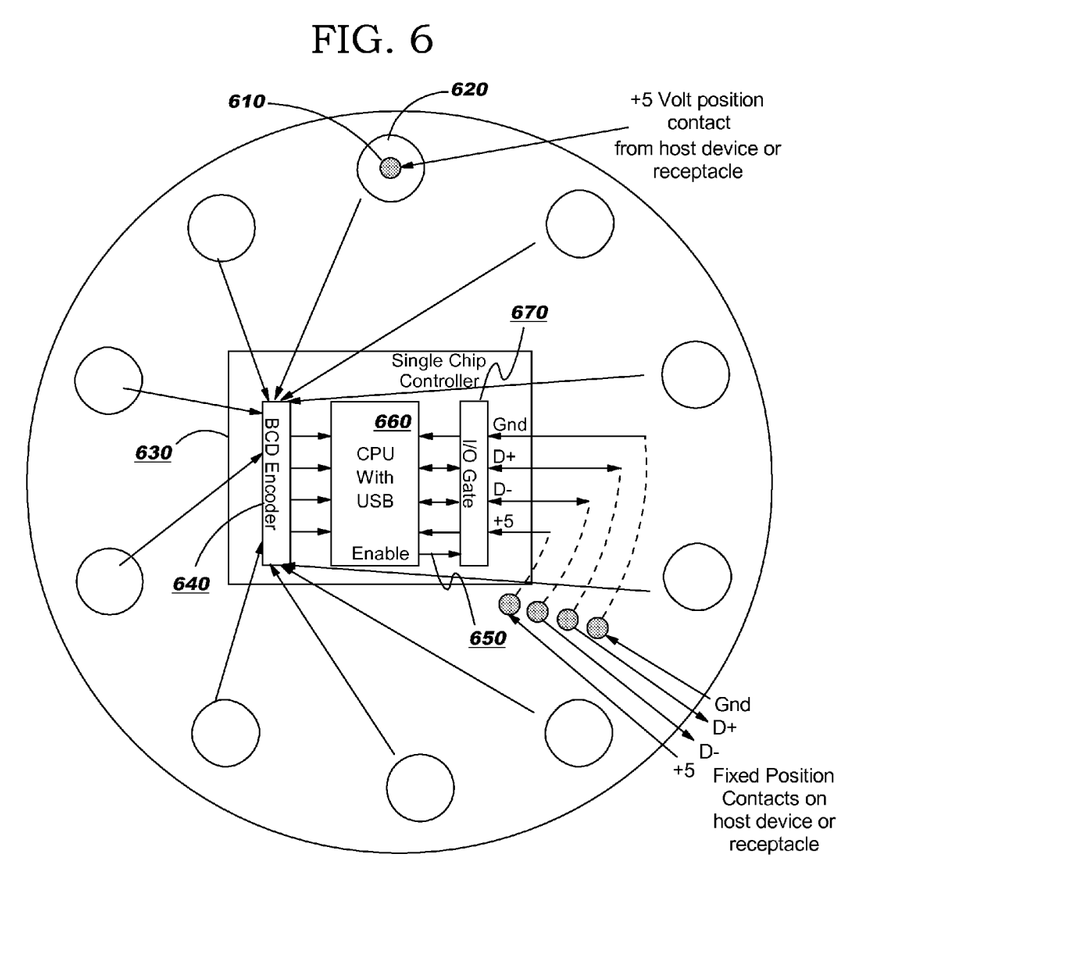
FIG. 6 provides a top-view illustration of a host-provided power source coming into electrical contact with a position determination contact on the memory device of FIG. 1.

FIG. 6 provides a top-view illustration of this host-provided 5-volt DC source 610 coming into electrical contact with one of the position determination contacts 620 on the memory device. Accordingly, as indicated at Block 410 of FIG. 4, the position determination contacts of the memory device receive power through the interface contact source, enabling the circuitry of the memory device to determine the position of the memory device according to which position determination contact is presently in contact with (and therefore receiving power from) the host receptacle's interface contact source. In preferred embodiments, a chip controller 630 embodied in the memory device has a binary-coded decimal ("BCD") encoder 640 that senses the current contact position of the memory device, in view of detecting this +5 volts, and converts that contact position to a BCD number.

As further shown in FIG. 6, chip controller 630 also comprises a central processing unit ("CPU") 660 and an I/O gate 670. CPU 660 is adapted for receiving signals from the BCD encoder, these signals representing the contact positions through which the memory device is being rotated. When provided in a USB environment, CPU 660 is configured to operate according to the USB protocol. (The USB protocol is well known to those of skill in the art, and a description thereof is not deemed necessary to an understanding of the present invention.)

Upon sensing power from the host receptacle, the circuitry of the memory device goes into "code entry mode", as noted at Block 420, and a "number of digits" counter (referred to in FIG. 4 as "n") is initialized to zero.

Based on the pattern of the interface contact source appearing on (i.e., contacting) the position determination contacts, a control unit monitors whether the correct user-selected code is entered. As noted earlier, this code entry may take a form analogous to entering digits with a combination lock or padlock—such as rotating two full turns to the left and stopping on the number "5", followed by rotating to the right and stopping on the number "3"—and the rotation pattern is detected, in preferred embodiments, as a sequence of 5-volt electrical pulses received at the BCD encoder.

In preferred embodiments, a timer is used when awaiting user input. If this timer interval expires before the user takes action, then it may be presumed that the user has changed his or her mind about entering a code, or has made a mistake in the entry sequence, or otherwise wishes to reset the process and begin again. By way of illustration but not of limitation, FIG. 4 refers to this timer as being a 5-second timeout timer. Accordingly, Block 430 tests whether the user has started rotating the memory device before the 5-second timeout occurs. If not (i.e., more than 5 seconds have passed with no rotation), then control returns to Block 420 to reset the code entry mode. Otherwise, when the timer has not expired, then the user is actively rotating the memory device and the processing in FIG. 4 continues at Block 440.

The user's input is obtained at Block 440. This input may comprise dialing to a digit by rotating the memory device. Or, the user input may comprise the user leaving the already-rotated memory device where it is, at least temporarily. In preferred embodiments, a digit-registration timer having a relatively short timeout interval is used (and in particular, this short timeout interval should be shorter than the timeout interval used for the 5-second timer that was discussed above with reference to Block 430). By way of illustration but not of limitation, FIG. 4 refers to this shorter timer as having a 1-second interval. Depending on how long the user leaves the already-rotated memory device where it is, this user action can then signal that the user wants to "register" the currently-dialed digit as being part of his or her security code (i.e., leaving the memory device in its current location for more than 1 second but less than 5 seconds). As an alternative, if the user wants to reset the code entry mode, then he or she leaves the memory device in its current location for more than 5 seconds, thereby triggering a reset (as discussed with reference to Block 430).

Block 450 therefore tests whether the memory device has stopped on a particular digit for more than 1 second. If not (i.e., the test in Block 450 has a negative result), then the user is presumably still in the process of rotating the memory device, and control thus returns to Block 440 (thereby giving the user additional time to make a selection). On the other hand, if the test in Block 450 has a positive result, this indicates that the user has stopped on this particular digit for a sufficiently long time (and is therefore not simply dialing past the present number), and processing continues at Block 460.

Block 460 saves the currently-selected number as digit[n] (i.e., the "n-th digit") of the user's security code, thereby registering this digit as part of the user-provided security code, and increments the digits counter "n" (i.e., setting "n" to "n+1"). Block 470 then tests whether "n" has the same value as a variable referred to therein as "code_length". This "code_length" variable is preferably a fixed value, such as 3 or 4, and indicates the number of sequential digits required to unlock the memory device. (Using 4 digits is preferred, as this provides 10,000 possible permutations.)

If the test in Block 470 has a negative result, then the user has not yet entered all of the digits of the security code, and in this situation, processing continues at Block 430 where a test is made to see if the user is rotating the memory device (as has been discussed above).

By contrast, if the test in Block 470 has a positive result, then the user has entered enough numbers to have entered a complete security code. That is, all "n" digits have been entered. Processing continues at Block 480, which checks the user's dialed-to values to see if they match the passcode for the memory device.

If the test in Block 480 has a negative result, this indicates that the user made at least one error when dialing in his or her security code. In preferred embodiments, this is followed by carrying out the reset procedure (see Block 420). If the test in Block 480 has a positive result, on the other hand, then the user has correctly entered all "n" digits of his or her security code, in the correct rotation order. Processing therefore continues at Block 490, where the controller of the memory device enables the I/O driver gates, thereby allowing access to the security-protected memory of the memory device. See FIG. 6, where the controller 630 brings the ENABLE line 650 active on the I/O gate, thus enabling the memory device. In a scenario where the memory device is provided as a USB memory key, USB logic on the key thus presents itself to the host device. Processing depicted in FIG. 4 then exits.

Optionally, data on the memory device may be encrypted for extra security, although this is not strictly required; without the correct sequence of digits entered, in the correct order of rotation, the logic of the memory device prevents access to the data stored therein.

While the first aspect has been discussed herein primarily in terms of using a memory device with a host device that is a laptop computer or similar device, this is by way of illustration and not of limitation.

In another aspect, the disclosed techniques may be used with other devices and/or other types of machinery to be protected with user authentication, as noted earlier. As one example, techniques disclosed herein may be used to provide an enhanced electronic identification ("ID") system, such as a disk storing an electronic ID. In this aspect, the protected information comprises the electronic ID, which may be (for example) a person's employee badge number. Possessing the electronic ID disk is not enough for a user to become authenticated; instead, the proper security code has to be dialed to enable a reader to actually read the electronic ID from the disk. Refer, for example, to the logic discussed above with reference to FIG. 4; this logic may also be used when implementing this electronic ID aspect.

While preferred embodiments are discussed herein with regard to a 10-digit dial, this is by way of illustration and not of limitation. In one alternative approach, a dial with a higher number of choices (which may, in some cases, require using a larger dial) may be provided. Instead of the numbers 0 through 9, additional and/or different symbols may be used. For example, letters and/or graphical symbols may be used.

A "code_length" variable is discussed with reference to FIG. 4. By increasing the value of this variable, security is enhanced because it becomes more difficult for an imposter to guess the security code of the memory device or electronic ID disk. Optionally, the value of the "code_length" variable may be configurable. For example, a tool kit may be provided that enables the user to change this value, and/or the security code itself, using a host computing device that provides an interface to the toolkit. In addition or instead, a toolkit may be used to configure the timer values discussed above with reference to FIG. 4. For example, a user may wish to increase the length of time required before inactivity (i.e., lack of rotating the dial) triggers a reset.

As a further option, an embodiment of the present invention may track not only the digits entered, but also the directional turns as part of the user's security code. For example, whether the dial arrives at some particular number by rotating to the right, as opposed to by rotating to the left, may be deemed significant in this approach. The direction of rotation may be captured, for example, by recording each digit that makes contact with the interface contact source, in addition to the digits at which the rotation stops.

As will be appreciated by one of skill in the art, selected components of the present invention may be provided as methods, systems, and/or computer program products comprising computer-readable program code. Accordingly, the present invention may take the form of an entirely hardware embodiment. An embodiment combining software (which includes but is not limited to firmware, resident software, microcode, etc.) and hardware aspects might be used alternatively. Or, components of the present invention may be provided in a software embodiment (as described in the appended claims).

Furthermore, components of the invention may take the form of a computer program product accessible from computer-usable or computer-readable media providing program code for use by, or in connection with, a computing device, chip, or any instruction execution system. For purposes of this description, a computer-usable or computer-readable medium can be any apparatus that can contain, store, communicate, propagate, or transport a program for use by, or in connection with, the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A method of securing information stored in a device, comprising:
   coupling, at least temporarily, the device to a host from which the device is adapted to receive a power signal, the host initially physically locked by the device from access thereto, wherein the power signal is received from the host responsive to the coupling;
   detecting, by the device, entry of an input pattern, the input pattern resulting from a plurality of rotation patterns performed by rotating the device while the device remains coupled to the host;
   comparing, by the device, the detected input pattern to a security code used to secure the stored information, wherein the security code is stored on the device; and
   physically unlocking access to the device, by the device, thereby enabling the host to access the stored information, responsive to the comparison indicating that the detected input pattern matches the stored security code.

2. The method according to claim 1, wherein the device is a memory device that provides, when access thereto is physically unlocked, memory for use by or through the host.

3. The method according to claim 1, wherein the information stored in the device comprises an electronic identification, and wherein the physically unlocking enables access to the electronic identification.

4. The method according to claim 1, wherein the plurality of rotation patterns comprises at least 4 rotation patterns.

5. The method according to claim 1, wherein the physically unlocking comprises enabling an input/output gate of the device.

6. The method according to claim 1, wherein the stored security code is updateable.

7. The method according to claim 1, wherein the detecting and comparing are performed by a chip controller embodied in the device.

8. The method according to claim 1, wherein a number of the rotation patterns required for entering the input pattern is configurable.

9. The method according to claim 1, wherein each of the rotation patterns comprises rotating the device until stopping, at least temporarily, at a position, and wherein the stopped-at position may vary from one of the rotations to another.

10. The method according to claim 9, wherein the device detects, for each of the rotation patterns, the rotating and the stopping by sensing a contact signal received from the host at the position of the stop.

11. The method according to claim 9, wherein for each of the rotation patterns, the device detects the stopping by sensing a contact signal received from the host at the position of the stop and detects the rotating, and a direction of the rotating, by sensing the contact signal received from the host at the position of the stop and at zero or more interim positions past which the device is rotated before reaching the position of the stop.

12. The method according to claim 9, wherein:
a plurality of contact points are provided on the device;
each of the stopped-at positions corresponds to one of the contact points; and
for each of the rotation patterns, the device detects the stopping by sensing a contact signal received from the host at the contact point corresponding to the stopped-at position and detects the rotating, and a direction of the rotating, by sensing the contact signal at zero or more interim ones of the contact points at which the contact signal is received prior to the stopping of the rotating at the contact point corresponding to the stopped-at position.

13. The method according to claim 9, wherein the detected input pattern comprises each of the stopped-at positions, in order of the rotations.

14. The method according to claim 9, wherein each of the stops is detected, by the device, responsive to the rotation pausing at the position longer than a first time interval and shorter than or equal to a second time interval, and wherein pausing at the position longer than the second time interval signals a reset of the input pattern.

15. The method according to claim 9, wherein each of the stops is detected, by the device, responsive to the rotation pausing at the position longer than a particular timer interval.

16. The method according to claim 15, wherein the particular timer interval is configurable.

17. The method according to claim 1, wherein the host is an access port coupled to a host device.

18. The method according to claim 17, wherein the access port is a Universal Serial Bus ("USB") port.

19. A self-contained system for securing information stored in a device, comprising:
a coupler for coupling, at least temporarily, the device to a host from which the device is adapted to receive a power signal, the host initially physically locked by the device from access thereto, wherein the power signal is received from the host responsive to the coupling;
a detector for detecting, by the device, entry of an input pattern, the input pattern resulting from a plurality of rotation patterns performed by rotating the device while the device remains coupled to the host;
a comparator for comparing, by the device, the detected input pattern to a security code used to secure the stored information, wherein the security code is stored on the device; and
an access granter for physically unlocking access to the device, by the device, thereby enabling the host to access the stored information, responsive to the comparison indicating that the detected input pattern matches the stored security code.

20. A computer program product comprising at least one computer useable storage media, the storage media embodying computer-usable program code for securing information stored in a device, wherein the computer-usable program code, when executed on the computing device, causes the computing device to:
detect, by the device, entry of an input pattern, the input pattern resulting from a plurality of rotation patterns performed by rotating the device, subsequent to receiving a power signal from a host to which the device is coupled, at least temporarily, wherein the host is initially physically locked by the device from access thereto and wherein the power signal is received from the host responsive to the coupling;
compare, by the device, the detected input pattern to a security code used to secure the stored information, wherein the security code is stored on the device; and
physically unlock access to the device, by the device, thereby enabling the host to access the stored information, responsive to the comparison indicating that the detected input pattern matches the stored security code.

* * * * *